United States Patent [19]

Bernard

[11] Patent Number: 5,183,841
[45] Date of Patent: Feb. 2, 1993

[54] REMOVABLE PRESSURE-SENSITIVE ADHESIVES FOR RECYCLABLE SUBSTRATES

[75] Inventor: Margaret M. Bernard, La Verne, Calif.

[73] Assignee: Avery Dennison Corporation, Pasadena, Calif.

[21] Appl. No.: 813,354

[22] Filed: Dec. 24, 1991

[51] Int. Cl.$^5$ .................. C08L 93/04; C08L 31/02; C08L 33/08; C08F 220/10
[52] U.S. Cl. .................. 524/272; 526/318.4; 524/560
[58] Field of Search .................. 524/271, 272

[56] References Cited

U.S. PATENT DOCUMENTS

| | | | |
|---|---|---|---|
| 4,167,433 | 9/1979 | Lakshmanan | 524/271 |
| 4,564,664 | 1/1986 | Chang et al. | 524/833 |
| 4,670,505 | 6/1987 | Craig | 524/704 |

*Primary Examiner*—Joseph L. Schofer
*Assistant Examiner*—Wu C. Cheng
*Attorney, Agent, or Firm*—Christie, Parker & Hale

[57] ABSTRACT

There is provided hot water and alkali removable pressure-sensitive adhesive composition based on inherently tacky, water insoluble emulsion pressure-sensitive adhesive acrylic polymers used in combination with a rosin based acidic tackifier and a rosin based surfactant.

36 Claims, No Drawings

REMOVABLE PRESSURE-SENSITIVE ADHESIVES FOR RECYCLABLE SUBSTRATES

CROSS-REFERENCE TO RELATED APPLICATIONS

This application is related to of application Ser. No. 07/567,141 filed Aug. 14, 1990 incorporated herein by reference which is a Continuation-In-Part of application Ser. No. 07/393,970, filed Aug. 14, 1989, now abandoned.

FIELD OF INVENTION

This invention relates to pressure-sensitive acrylic adhesives formulated to exhibit the properties of a permanent adhesive for use with paper and polymer film backed labels and which remove cleanly within about 5 minutes from nonpaper surfaces such as polymeric (plastic), glass and metal substrates under the action of hot water or with hot alkaline solutions such as household detergent solutions or caustic alkali solutions.

BACKGROUND OF THE INVENTION

Pressure-sensitive adhesives which are used for label applications do not in general remove cleanly from nonpaper substrates. Some residue of the adhesive is left on the substrate thus making its cleaning less effective or more involved. There is a growing need in the market today for environmentally or user friendly pressure-sensitive adhesive labels which can be cleanly removed from the substrate during domestic or industrial cleaning processes. This is true in the case of price marking and product identification labels used on metals, polymers (plastics), glass, wood and painted or water resistant coated substrates.

Attention in this regard has focused on water dispersible, water soluble, repulpable and wet stick adhesives. Most of the base polymers for such adhesives are not inherently pressure-sensitive adhesives. Being nontacky they require the addition of high levels of plasticizers and/or tackifiers. Carboxyl content of the base polymer is also high, exceeding 10% by weight of the polymer, such carboxyl groups are incorporated into the polymer during polymerization. When the base polymer used for a removable adhesive is pressure sensitive, it is usually compounded with at least 10% by weight of a vinyl carboxylic acid polymer either in the acid or salt form and various amounts of plastisizers and/or tackifiers.

U.S. Pat. No. 4,033,918 to Hauber discloses a water removable pressure-sensitive adhesive composition which comprises based on 100 parts weight of the total solids, of from 25 to 35 parts by weight of a crosslinked acrylic acid ester copolymer which contains 10 to 20% by weight of unsaturated carboxylic acid, vinyl acetate, 2-ethyl hexyl acrylate, acrylonitrile, diethyl maleate and mixtures thereof, from 10 to 20 parts by weight of an uncrosslinked acrylic acid ester copolymer, from 10 to 20 parts by weight of polyvinylmethyl ether, from 10 to 20 parts by weight of an alkali metal and/or ammonium salt of polyacrylic acid, polymethacrylic acid or a copolymer of acrylic and methacrylic acids; 10 to 20 parts by weight of monomeric plasticizer such as a polyvinyl methyl ether or phthalate ester and 10 to 15 parts by weight of an emulsifying agent such as ethoxylated phenols.

U.S. Pat. Nos. 3,865,770, 4,413,080 and 4,569,960 to Blake disclose tapes providing water dispersible/water soluble pressure-sensitive adhesives for use as a repulpable splicing tape. The adhesives described are solvent polymerized alkyl acrylate and acrylic acid polymers, neutralized with alkanolamines, or potassium hydroxide used in combination with sodium hydroxide and/or lithium hydroxide. The polymer is further blended with acidic rosin or rosin derivatives and plasticized with hydrophilic polyoxyethylene compounds. Adhesive compositions comprise a polymer containing 60–85% alkyl acrylate and 10 to 40% vinyl carboxylic acid. The formulated adhesives have 35 to 150 parts by weight of acidic rosin, and/or 50 to 250 parts by weight of surfactant (ethoxylated alkyl phenols add/or complex acidic esters of phosphoric acid). High levels of plasticizer and high levels of rosin acid pose aging problems due to separation or migration thereby decreasing the adhesive properties. The adhesive tapes are sold in closed containers to preserve adhesive properties which are rapidly lost on exposure to atmospheric humidity.

U.S. Pat. No. 4,492,724 to Albright, et al. describes a humidity resistant wet-stick pressure-sensitive adhesive made up of three components. Two are nonpressure-sensitive polymeric components containing high levels of polymerizable acids and the third component consisting of an ethoxylated alkyl arylphenol which serves as a plasticizer/tackifier to make the composition a pressure-sensitive adhesive. The first component is a copolymer of vinyl acetate, alkyl acrylate and acrylic acid in which the acrylic acid is present in an amount of from 20 to 55% by weight, the second component is an acrylic acid polymer which is present from 8 to 35% by weight and the plasticizer is present in an amount of from 20 to 65% by weight.

U.S. Pat. No. 4,413,082 to Gleichenhagen, et al. teaches a water soluble pressure-sensitive adhesive composition for repulpable splicing tape comprising from 30 to 80 parts of a copolymer of 70 to 88% by weight of butyl acrylate of which 5 to 25% can be a mixture of vinyl acetate and fumaric acid dialkyl ester and 12 to 30% by weight vinyl carboxylic acid blended with from 20 to 70 parts by weight of a water soluble plasticizer which is ethoxylated alkyl phenol, ethoxylated alkyl mono or diamine and from 2 to 30 parts by weight of an acidic rosin. The adhesive is water soluble and contains more than 10% of vinyl carboxylic acid in the polymer.

U.S. Pat. No. 4,418,120 to Kealy, et al. relates to a tackified crosslinked acrylic adhesive which display improved adhesion to low energy substrates. The adhesive is based on a solution polymer of iso-octyl acrylate and acrylic acid containing from 3 to 7% by weight acrylic acid, 100 parts of which is blended with 20 to 50 parts of a tackifying rosin ester having an acid number less than 20, additionally the adhesive contains certain antioxidants and a crosslinking agent, is coated and dried at 70° C. to allow for crosslinking. The composition is required to be free of surfactants to achieve the designated performance.

U.S. Pat. No. 4,726,982 to Traynor, et al. relates to a tackified acrylic pressure-sensitive adhesive for application to high solids automotive paints. The adhesive is also a solution polymer of acrylic acid ester of nontertiary alcohol containing from 4 to 14 carbon atoms, which polymers contain from 10 to 40 parts of N-vinyl lactam and is tackified with 5 to 50 parts, based on the weight of the polymer, of tackifying resins such as isobornyl methacrylate, rosin ester, and/or mixed aliphatic/aromatic polymeric tackifier resins. A suitable combination of the N-vinyl lactam and the tackifier is needed to provide high adhesion to automotive paint. Compositions with less than 10% N-vinyl lactam do not provide the high adhesion. The tackifying resins are either esters or hydrocarbon resins with no carboxyl functionality.

SUMMARY OF THE INVENTION

The present invention pertains to a water insoluble pressure-sensitive acrylic emulsion polymer which on blending with low levels of a surfactant and a tackifier provides an adhesive, when applied with a paper or film backing, which can be removed clean from a nonpaper surface in less than 5 minutes under the action of hot water or hot alkaline conditions such as detergent or caustic alkali. It aids in label removal from the substrate at the time of acquisition or at the time of substrate recycling or recovery. The formulated adhesive exhibits excellent adhesion to and clean removal from a wide variety of substrates including metal, glass and polymeric substrates (plastics).

According to the present invention, there is provided an acrylic emulsion pressure-sensitive adhesive polymer which is blended with one or more acidic rosin based tackifiers and one or more rosin based surfactants displays excellent adhesion to a wide variety of surfaces ranging from polar, relatively high energy surfaces such as stainless steel to nonpolar, relatively low energy surfaces such as polyethylene. The pressure-sensitive adhesive composition displays permanent adhesive characteristics yet removes clean from nonpaper surfaces of substrate under the action of hot water or an alkaline solution.

The preferred inherently tacky, emulsion pressure-sensitive adhesive polymers of the instant invention comprise, on a polymerized basis and, based on the total weight of the monomers, at least one alkyl acrylate containing from about 4 to about 8 carbon atoms in the alkyl group, preferably 2-ethyl hexyl acrylate, the alkyl acrylate present being in a total amount of at least about 35 percent by weight of the monomers, and at least one unsaturated carboxylic acid present in a positive amount up to 5 per cent by weight of the acrylic based pressure sensitive adhesive polymer. It is preferred that the alkyl acrylate be present in a total amount of from about 35 to about 60 percent by weight; and that there also be present at least one vinyl ester containing from 2 to about 16 carbon atoms in the alkyl chain of the ester, preferably vinyl acetate, said vinyl ester present in a total amount of from about 15 to about 35 percent by weight; at least one diester of a dicarboxylic acid wherein each alkyl group of the diester independently contains from about 6 to about 16 carbon atoms, with di-2-ethyl hexyl maleate or di-2-ethyl hexyl fumarate being preferred, said diesters being present in a total amount of from about 20 to about 40 percent by weight. It is preferred that the adhesive contain 1 to 3 percent, of an unsaturated carboxylic acid containing from 3 to about 5 carbon atoms, preferably acrylic and/or methacrylic acid, and that said emulsion polymer have a glass transition temperature of less than about $-30°$ C. and a gel content of from about 50 to about 70 percent by weight of the polymer.

Although the emulsion adhesive polymers of the instant invention can be prepared by using conventional surfactants, it is preferred to additionally employ a reactive surfactant which polymerizes and becomes part of the emulsion polymer. If employed, the amount of reactive surfactant used in the preparation of the emulsion pressure-sensitive adhesives of the present invention may be in an amount up to about 0.4 percent by weight of the total monomers, preferably from about 0.1 to about 0.25 percent by weight. The preferred reactive surfactants are anionic vinyl functional surfactants, such as sodium vinyl sulfonate and sodium styrene sulfonate.

The preferred adhesive comprises a copolymer of about 15 to about 35% by weight vinyl acetate, about 20 to about 40% by weight of di-2-ethylhexyl maleate, about 35 to about 60% by weight of 2-ethylhexyl acrylate and 1 to 3% by weight of one or more vinyl unsaturated carboxylic acids and for each 100 parts by weight of the polymer from about 3 to about 20 parts by weight of acidic rosin or rosin derivative provided as a tackifier and about 1 to about 10 parts by weight of rosin based surfactant preferably an ethoxylated rosin based surfactant.

The adhesive has wide applicability as an aggressive adhesive for paper and film labels and tapes which can be removed clean from the nonpaper substrates, thus making recycling/recovering operations or simply the removal of a price label at substrate acquisition easy. The base polymer of the present invention as compared to the '918 patent has a different composition in that the adhesive of this invention is preferably not externally crosslinked and preferably contain more than 20% dialkyl maleate and more than 20% vinyl acetate besides acrylic acid ester. The formulated adhesive contains more than 80% by weight of polymer, less than 5% of surfactant and less than 10% tackifier the later being rosin based as opposed to polyvinylmethyl ether or phthalate esters.

The adhesives of the present invention are different than the adhesives of Blake in that the base polymer preferably contains vinyl esters and alkyl diesters besides the alkyl acrylate and has low levels of vinyl carboxylic acid, i.e., much less than 10% contrary to the high acid requirement of Blake. The adhesive compositions of the present invention are not water dispersible or water soluble as taught by Blake. The labels made from the composition remove clean from the substrate in hot water.

DETAILED DESCRIPTION

The present invention relates to pressure-sensitive adhesive compositions based on emulsion acrylic polymers which provide high adhesion and high tack to polar and nonpolar substrates with excellent cohesion which polymers are modified by rosin based acidic tackifiers and rosin based surfactants which allow retention of permanent adhesion, but which enable clean removability from a wide variety of nonpaper surfaces including metal, glass and polymeric substrates under the action of hot water and alkali solution.

By the expression "nonpaper surface," as used herein, there is meant a surface which does not break up or absorb significant amounts of moisture and include polar and nonpolar surfaces such as metal, glass, plastics, wood, paint, coated surfaces, even coated paper substrate which allow hot water and alkaline solutions to cause separation of the adhesive coated label without an adverse effect on the substrate.

The acrylic based emulsion pressure sensitive adhesive polymers used in the invention are polymers which contain at least 35 percent by weight total of one or more alkyl acrylates containing from about 4 to about 8 carbon atom in the alkyl group and a positive amount up to about 5 percent by weight total of vinyl unsaturated carboxylic acids containing from about 3 to about 5 carbon atoms.

The emulsion based pressure-sensitive adhesive polymers of the instant invention are preferably inherently tacky polymers which contain, on a percent by weight basis, from about 35 to about 60 percent by weight total of one or more alkyl acrylates containing about 4 to about 8 carbon atoms in the alkyl group. Preferably the total alkyl acrylate concentration, including mixtures of alkyl acrylates, is from about 40 to about 50 percent by weight of the monomers. Useful alkyl acrylates include n-butyl acrylate, 2-ethyl hexyl acrylate, isooctyl acrylate, and the like, with 2-ethyl hexyl acrylate being preferred.

The second monomeric component is one or more vinyl esters present in a total amount of from about 15 to about 35 percent by weight, preferably from about 20 to about 25 percent by weight based on total weight of the monomers, said vinyl esters containing from 2 to about 16 carbon atoms in the alkyl group of the ester.

Representative of the vinyl esters include vinyl acetate, vinyl butyrate, vinyl propionate, vinyl isobutyrate, vinyl valerate, vinyl versitate, and the like. Vinyl acetate is preferred.

The third component of the emulsion polymers used in the instant invention are one or more diesters of a dicarboxylic acid and mixtures thereof, present in a total amount of from about 20 to about 35 percent by weight based on the total weight of the monomers. Each ester group of the diester of the dicarboxylic acid independently contains from about 6 to about 16, preferably from about 6 to about 12, carbon atoms. The preferred diesters are di-2-ethyl hexyl maleate, di-2-ethyl hexyl fumarate and mixtures thereof.

A fourth component of the instant invention is at least one unsaturated carboxylic acid containing from about 3 to about 5 carbon atoms and present in a total amount of up to about 5 percent by weight of the polymer, preferably from to about 3 percent by weight. The unsaturated carboxylic acid includes, among others, acrylic acid, methacrylic acid, itaconic acid, and the like. Acrylic acid, methacrylic acid, and more preferably mixtures thereof, are presently preferred.

The emulsion adhesives of the instant invention may be prepared in the presence of a reactive surfactant which polymerizes during formation of the polymer and becomes an integral part of the polymer. Preferred reactive surfactants include anionic vinyl functional monomers such as sodium vinyl sulfonate, sodium styrene sulfonate and the like. The reactive surfactant is present as part of the total surfactant system and in an amount up to about 0.4 percent by weight of the total monomers, preferably about 0.1 to about 0.25 percent by weight.

Presently preferred emulsion polymers contain, about 48 percent by weight 2-ethyl hexyl acrylate, about 21 percent by weight vinyl acetate, about 29 percent by weight di-2-ethyl hexyl maleate, about 1 percent by weight acrylic acid, and about 1 percent by weight methacrylic acid and are formed as an emulsion having a solids content of about 59.6% and a pH of about 3.8.

The monomer proportions are preferably adjusted in such a way that the adhesive has a glass transition temperature less than about $-30°$ C., preferably less than about $-34°$ C., giving a good balance of adhesion and tack at room temperature and low temperatures. Depending on polymerization conditions, copolymers showing two distinct glass transition temperatures, one in the region of $-45°$ to $-60°$ C. and the other in the region of $-15°$ to $-30°$ C., have been observed.

Gel content or percent insolubles maybe and are preferably in the range of 50 to 65 percent by weight which provides excellent cohesive strength without the use of multifunctional monomers or external crosslinking. In this regard, gel represents the amount of polymer which is insoluble in tetrahydrofuran expressed in percent by weight and determined by the membrane gel partitioning method. In this method, about 600 to 800 milligrams of 100 percent solid polymer is weighed onto a millipore membrane disk of 5 micrometer porosity. The disk is heat sealed and transferred to a scintillation vial. About 20 milliliters of tetrahydrofuran is added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Percent insoluble} = \frac{(b - c) \times 100}{a} = \% \text{ gel}$$

wherein
  a = total weight of 100 percent solids polymer;
  b = the weight of the polymer plus membrane before tetrahydrofuran treatment; and
  c = polymer plus membrane remaining after tetrahydrofuran treatment.

Polymers of the instant invention are prepared by emulsion polymerization under conditions of agitation in an autogenous atmosphere in the presence of suitable polymerization initiators such as peroxydisulfate and peroxides. Depending on desired polymer properties including gel content, the preferred levels of these initiators are in the range of from about 0.5 to about 1.0 percent by weight based on the total weight of the monomers. The presently preferred initiators are potassium persulfate, t-butyl hydrogen peroxide, and the like. Level of agitation will vary depending on the system and will influence conversion. Typically, about 30 to 50 percent of the total initiator is added along with an initial monomer charge to the reactor, and the rest is added along with the balance monomers during polymerization over a period of from about 4 to about 5 hours. For the polymer to be free from coagulum and to maintain grit levels less than 20 ppm, it is desirable to maintain the pH of the emulsion during polymerization between from about 2 to about 4, preferably from about 2.5 to about 4. This can be achieved by the use of buffers such as sodium bicarbonate and sodium acetate, typically in amounts up to 0.3 percent by weight based on the weight of the monomer.

The stabilizer system used during polymerization contains a combination of anionic and nonionic surfactants present in an amount up to about 3.5 percent by weight based on the weight of the monomers. A suitable anionic surfactant is the sodium salt of an ethoxylated nonylphenol sulfate, and a suitable nonionic surfactant is ethoxylated nonylphenol. The best balance of properties is achieved by maintaining the anionic to nonionic surfactant ratio approximately 3 to 1.

Polymers of the instant invention are produced at high solids level content, typically about 50 to about 70 percent by weight. Reaction is carried out at temperatures from 70° to 85° C. with an initial charge of up to about 10 percent by weight of the total monomers, with the balance of the monomers being added to the emulsion reaction system over a period of about 4 to about 5 hours, with total monomer conversion approaching 100 percent.

It is possible to modify the rheology of the polymer for coating purposes by use of conventional thickeners such as SCT-270 manufactured and sold by Union Carbide and present in an amount up to 0.2 percent by weight. Although not required, it is also feasible to modify the properties by the use of tackifiers and the like. For general purpose applications, it is desirable to have good adhesion to both hydrophobic substrates such as polyethylene and hydrophilic substrates such as stainless steel.

The presently preferred emulsion polymer used for removability purposes is the pressure-sensitive adhesive described in Example 3 of pending application Ser. No. 562,141. Good conversion is obtained by feeding a pre-emulsified monomer mix along with potassium persulfate as catalyst into the reactor over a period of 4 to 5 hours at temperatures ranging from 70° to 85° C. The adhesive polymer as such is a permanent electronic data processing label adhesive used on (EDP) and other paper facestock and build in adhesion over a period of time causing the facestock to tear in 180 or 90° peel tests. The adhesive has low levels of vinyl carboxylic acid unlike polymers taught in the prior art.

By formulating the adhesive with suitable rosin acid and rosin based tackifiers and rosin based surfactant systems labels and tapes made with the formulated adhesive composition remove clean from substrates in hot water or in hot alkaline wash cycle either by use of household detergents such as Cascade® or caustic alkali (2-3% by weight of solution). The blended product essentially consists of 100 parts of the emulsion polymer, about 3 to about 20 parts rosin acid tackifier and from about 1 to about 10 parts surfactant. The preferred composition consists of 100 parts of the emulsion polymer, about 3 to about 15 parts of rosin acid tackifier, and from about 1 to about 5 parts by weight surfactant.

Surfactants useful in the present invention include nonionic ethyleneoxide adducts of pale wood rosin containing about 15 moles of ethylene oxide, sold by Hercules, Inc. under the trade name AR-150. Being rosin based, this surfactant differs from surfactants disclosed in the prior art which are mainly polyoxyalkylene alkyl phenols, polyoxyalkylene glycols and polyoxyalkylene phenols. When present as per the prior art, they are required to be used in greater than 20 parts by weight based on 100 parts by weight of polymer and in most cases >50 parts by weight to give the required performance. The level of rosin based surfactant used in the instant invention is less than 10 parts by weight per 100 parts polymer, the optimum level being about 1.0 to about 5.0 parts by weight. The other rosin based surfactants which may be useful are Dresinates made by Hercules, Inc. which are potassium or sodium salts of modified rosin. Suitable surfactants include Dresinate 81, 90-95 and Dresinate 214, 515, and 731. Higher amounts of surfactant tend to reduce the shear and adhesion values on the required substrates.

The tackifying resins suitable for this application are noncrystallizing resins and include fully or partially polymerized rosins, modified rosins, disproportionate rosins, stabilized rosins, hydrogenated rosins and the like, preferably having an acid number (Acid No.) greater than 50 and less than 210 (acid no. expressed as mg. of KOH/gram of resin) with a softening point of about 50° to about 170° C. The most preferred resins have a softening point of about 60° to about 95° C. and an Acid No. of 100 to 140. The preferred resins are Sylvatac R-85, R-95 and R-295 sold by Arizona Chemicals, Unitac 70 sold by Union Camp, Foral AX, Hercules 73iD resin, Pentalyn 261 supplied by Hercules, Snowtack 301A, 342A, 820A, 380A, 380B and 385F sold by EKA Nobel. The resins with acid number in excess of 160 and softening points exceeding 100° C. tend to create partial incompatibility with the polymer when used in levels higher than 10 parts per 100 parts of the polymer. Resin levels exceeding 20 parts reduce the shear values and cause zippiness during peel.

The tackifying resins can be used in the dispersion form or in the solubilized form. Resin dispersions are commercially available from the supplier and are used as such. For solid resins, solubilization is effected either by dissolving the resin by water and ammonium hydroxide with a suitable anionic surfactant or by dissolving the resin in isopropyl alcohol and ammonium hydroxide then diluting the solution with water and adding a suitable anionic surfactant. The total solid content of the tackifying resin is maintained between about 40 to about 60% by weight. The optimum level for the application is about 5 to about 20 parts by weight and the preferred level is 5 to about 15 parts for 100 parts of the polymer.

The tackifying resin by itself or the surfactant by itself when combined with the polymer do not promote removability in hot water or under hot alkaline conditions. When blended in suitable ratios and coated on paper facestock the adhesives remove clean in less than 5 minutes from the surface of the substrate when immersed in agitated hot water or in hot alkaline solutions such as detergent or 2-3% caustic alkali, all held at 50° to about 60° C. They may be and preferably are formulated to resist cold water removal in a reasonable amount of time. This allows them use on labels adhered to substrates which contract cold water for extended periods of time. The label remains intact, although it may be peeled from the substrate. In any event the bond is not undermined and will recover on drying. The appropriate pH of the blended product is maintained between about 6.5 and about 8 by the addition of ammonium hydroxide. Use of alkali metal hydroxides in the place of ammonium hydroxide tends to adversely affect peel and tack adhesion by inducing zippiness on peel which is unacceptable.

A preferred composition of the blended product consists of 100 parts by weight of the emulsion polymer, 1 to about 5 parts by weight of the surfactant and about 3 to about 20 parts by weight of the tackifying resin. The preferred composition consists of 100 parts by weight of the emulsion polymer, about 1 to about 5 parts of AR-150 surfactant, about 3 to about 20 parts of Snowtack 385F or a combination of Snowtack 385F with 380A or 380B or 820A or 301A.

In the preferred method of formulation, the surfactant is added to an emulsion containing the polymer with agitation followed by the addition of the tackifying resin solution or dispersion. pH is then adjusted to about 6.5 to about 7.5. The emulsion is then coated at 20 to 25 g/m² coat weight on a release paper, dried at 70° C. for 10 minutes and laminated to the backing preferably high gloss, DSX paper and dual print paper. Polymeric film backing or face stocks may also be used.

In the following Examples (Ex) and Controls (Cont) 2.5×10 cm paper backed labels were applied to the substrate and tested for removability after 1 week dwell by immersing the total construction in the respective solutions at the required temperatures and observing the time the label self-separates from the substrate. The formulation is considered good if the label removes cleanly from a substrate in less than about 5 minutes without leaving any adhesive residue in hot water or alkali and excellent if self removal is from multiple substrates. Controls have a removal time of more than 5 minutes for all substrates evaluated. Table I illustrates the different compositions based on solubilized tackifier resin. Table 2 is for water dispersions of tackifier resins. The numbers are parts by weight in grams of the components which went into the formulation for each 100 parts of the preferred polymer. Removability data indicate the time in minutes for the label to cleanly self-separate from the substrate without a residue. The temperatures of the hot water and the alkali were maintained between 50 to about 60° C. All formulations which pass the removability test on polyethylene (PE) and stainless steel (SS) are considered capable and pass the same test on polyester (PET) and glass (GL) and vice a versa. All samples which pass in hot water also pass in hot alkaline conditions. Table 3 provides adhesive properties of some of Exemplary Example compositions and Control compositions.

TABLE 1

| Ex/ Cont | Surfactant | wt. % | Tackifying Resin | wt. | Hot Water Removal Time, Min | | 3% NaOH Removal Time, Min | |
|---|---|---|---|---|---|---|---|---|
| | | | | | PE | PET | SS | GL |
| Ex1 | AR-150 | 5.0 | Pentalyn 261 | 5.0 | <2.0 | — | <3 | <2 |
| Ex2 | AR-150 | 5.0 | Pentalyn 261 | 10.0 | <3.0 | — | <3 | <3 |
| Ex3 | AR-150 | 2.5 | Pentalyn 261 | 5.0 | 2.0 | — | — | — |
| Ex4 | AR-150 | 2.5 | Pentalyn 261 | 7.5 | 2.5 | — | — | — |
| Ex5 | AR-150 | 5.0 | Unitac 70 | 10.0 | 2.0 | — | — | — |
| Ex6 | AR-150 | 5.0 | Unitac 70 | 20.0 | 2.0 | — | — | — |
| Ex7 | AR-150 | 5.0 | Unitac 70 | 15.0 | 2.0 | — | 3 | — |
| Ex8 | AR-150 | 5.0 | Unitac 70 | 5.0 | — | — | <5 | — |
| Ex9 | AR-150 | 2.5 | Unitac 70 | 7.5 | <2.0 | — | — | — |
| Ex10 | AR-150 | 5.0 | Sylvatac R85 | 5.0 | <5.0 | — | — | — |
| Ex11 | AR-150 | 2.5 | Sylvatac R85 | 5.0 | — | — | 5 | — |
| Ex12 | AR-150 | 5.0 | Sylvatac R85 | 7.5 | <3.0 | — | — | — |
| Ex13 | AR-150 | 2.5 | Sylvatac R85 | 7.5 | 7 | — | 4 | — |
| Ex14 | AR-150 | 5.0 | Sylvatac R85 | 10.0 | <4.0 | — | — | — |
| Ex15 | AR-150 | 2.0 | Sylvatac R85 | 5.0 | >2.0 | — | — | — |
| Ex16 | AR-150 | 2.25 | Sylvatac R85 | 7.5 | <5.0 | — | — | — |
| Ex17 | AR-150 | 2.0 | Sylvatac R85 | 10.0 | <4.0 | — | — | — |
| Ex18 | AR-150 | 2.25 | Sylvatac R85 | 10.0 | <2.0 | — | — | — |
| Ex19 | AR-150 | 5.0 | Resin 731D | 10.0 | <3.0 | — | — | — |
| Ex20 | AR-150 | 2.5 | Resin 731D | 10.0 | <3.0 | — | — | — |
| Ex21 | AR-150 | 5.0 | Foral AX | 10.0 | <4.0 | — | — | — |
| Ex22 | AR-150 | 2.5 | Foral AX | 10.0 | <4.0 | — | — | — |
| Ex23 | Dresinate 731 | 5.0 | Snowtack 301A | 5.0 | <3.0 | — | — | — |
| Ex24 | Dresinate 515 | 5.0 | Snowtack 301A | 5.0 | <4.0 | — | — | — |
| Cont1 | AR-150 | 0.0 | Unitac 70 | 10.0 | >10.0 | — | >10 | — |
| Cont2 | AR-150 | 5.0 | Unitac 70 | 0.0 | >10.0 | — | >10 | — |
| Cont3 | AR-150 | 10.0 | Unitac 70 | 0.0 | >10.0 | — | >10 | — |
| Cont4 | AR-150 | 1.0 | Sylvatac R85 | 5.0 | >15.0 | — | — | — |
| Cont5 | AR-150 | 1.75 | Sylvatac R85 | 5.0 | >15.0 | — | — | — |
| Cont6 | AR-150 | 1.5 | Sylvatac R85 | 7.5 | >15.0 | — | — | — |
| Cont7 | Dresinate 91 | 5.0 | Sylvatac R85 | 0.0 | >30.0 | — | — | — |
| Cont8 | Dresinate 91 | 2.5 | Sylvatac R85 | 5.0 | >15.0 | — | — | — |
| Cont9 | Dresinate 91 | 1.5 | Sylvatac R85 | 5.0 | >15.0 | — | — | — |
| Cont10 | AR-150 | 5.0 | Resin 731D | 5.0 | <10.0 | — | — | — |
| Cont11 | AR-150 | 2.5 | Resin 731D | 5.0 | >30.0 | — | — | — |
| Cont12 | AR-150 | 5.0 | Foral AX | 5.0 | 10.0 | — | — | — |
| Cont13 | AR-150 | 2.5 | Foral AX | 5.0 | >15.0 | — | — | — |
| Cont14 | Dresinate 731 | 3.0 | Snowtack 301A | 5.0 | <7.0 | — | — | — |
| Cont15 | Dresinate 515 | 3.0 | Snowtack 301A | 5.0 | >10.0 | — | — | — |

HW = hot water
PE = high density poly ethylene milk cans
PET = polyester film
SS = Stainless steel
GL = Glass
The sign > indicates that the test was discontinued after that period of time

TABLE 2

| Ex/ Cont | Surfactant | wt. % | Tackifying Resin | wt. % | Hot Water Removal Time, Min | | 3% NaOH Removal Time, Min | |
|---|---|---|---|---|---|---|---|---|
| | | | | | PE | PET | SS | GL |
| Ex25 | AR-150 | 5.0 | Snowtack 301A | 5.0 | <2 | <2 | <3 | — |
| Ex26 | AR-150 | 5.0 | Snowtack 301A | 20.0 | <5 | <2 | <3 | — |
| Ex27 | AR-150 | 5.0 | Snowtack 301A | 10.0 | <5 | — | <3 | — |
| Ex28 | AR-150 | 2.5 | Snowtack 301A | 10.0 | <5 | — | — | — |
| Ex29 | AR-150 | 5.0 | Snowtack 301A | 15.0 | <2 | — | <1 | — |
| Ex30 | AR-150 | 2.5 | Snowtack 301A | 15.0 | <3 | — | <2 | — |
| Ex31 | AR-150 | 3.25 | Snowtack 301A | 5.0 | <4 | — | — | — |

TABLE 2-continued

| Ex/Cont | Surfactant | wt. % | Tackifying Resin | wt. % | Hot Water Removal Time, Min PE | Hot Water Removal Time, Min PET | 3% NaOH Removal Time, Min SS | 3% NaOH Removal Time, Min GL |
|---|---|---|---|---|---|---|---|---|
| Ex32 | AR-150 | 3.0 | Snowtack 301A | 7.5 | 3 | — | — | — |
| Ex33 | AR-150 | 2.75 | Snowtack 301A | 7.5 | — | — | 2 | — |
| Ex34 | AR-150 | 1.5 | Snowtack 301A | 10.0 | <4 | — | — | — |
| Ex35 | AR-150 | 1.25 | Snowtack 301A | 10.0 | <4 | — | — | — |
| Ex36 | AR-150 | 2.82 | Snowtack 301A | 8.0 | 1 | — | 5 | — |
| Ex37 | AR-150 | 1.75 | Snowtack 301A | 12.25 | 2 | — | 5 | — |
| Ex38 | AR-150 | 2.95 | Snowtack 301A | 7.5 | 2 | — | 2 | — |
| Ex39 | AR-150 | 3.1 | Snowtack 301A | 5.0 | <3 | — | <5 | — |
| Ex40 | AR-150 | 3.15 | Snowtack 301A | 5.0 | <5 | — | <5 | — |
| Ex41 | AR-150 | 5.0 | Snowtack 385F | 10.0 | <2 | — | — | — |
| Ex42 | AR-150 | 2.5 | Snowtack 385F | 10.0 | <5 | — | — | — |
| Ex43 | AR-150 | 5.0 | Snowtack 385F | 15.0 | 3 | — | — | — |
| Ex44 | AR-150 | 2.5 | Snowtack 385F | 15.0 | <5 | — | — | — |
| Ex45 | AR-150 | 3.75 | Snowtack 385F | 5.0 | <1 | — | — | — |
| Ex46 | AR-150 | 3.3 | Snowtack 385F | 5.0 | <2 | <2 | <2 | — |
| Ex47 | AR-150 | 2.82 | Snowtack 385F | 8.0 | <2 | — | <5 | — |
| Ex48 | AR-150 | 2.85 | Snowtack 385F | 7.5 | 3 | — | <5 | — |
| Ex49 | AR-150 | 2.95 | Snowtack 385F | 7.5 | 2 | — | <5 | — |
| Ex50 | AR-150 | 3.5 | Snowtack 380A | 10.0 | <3 | <4 | — | <2 |
| Ex51 | AR-150 | 3.25 | Snowtack 380B | 7.5 | <3 | <5 | — | <2 |
| Ex52 | AR-150 | 3.25 | Snowtack 820A | 6.85 | <5 | <5 | — | <2 |
| Ex53 | AR-150 | 3.2 | Snowtack 385F | 5.0 | 2 | 1 | 3 | — |
| Ex54 | AR-150 | 3.15 | Snowtack 385F | 5.0 | 6 | — | 3 | — |
| Cont16 | AR-150 | 2.5 | Snowtack 301A | 5.0 | 10–15 | — | — | — |
| Cont17 | AR-150 | 2.75 | Snowtack 301A | 5.0 | <10 | — | — | — |
| Cont18 | AR-150 | 2.5 | Snowtack 301A | 7.5 | <10 | — | — | — |
| Cont19 | AR-150 | 0.0 | Snowtack 301A | 10.0 | >15 | — | <4 | — |
| Cont20 | AR-150 | 0.0 | Snowtack 301A | 20.0 | >15 | — | — | — |
| Cont21 | AR-150 | 2.5 | Snowtack 385F | 5.0 | 10–15 | — | — | — |
| Cont22 | AR-150 | 2.75 | Snowtack 385F | 5.0 | >10 | — | — | — |
| Cont23 | AR-150 | 2.5 | Snowtack 385F | 7.5 | 9 | — | — | — |
| Cont24 | AR-150 | 3.0 | Snowtack 385F | 7.5 | <7 | — | — | — |
| Cont25 | AR-150 | 2.75 | Snowtack 385F | 7.5 | <10 | — | — | — |
| Cont26 | AR-150 | 0.0 | Snowtack 385F | 10.0 | >15 | — | <4 | — |
| Cont27 | AR-150 | 0.0 | Snowtack 385F | 20.0 | >15 | — | <4 | — |
| Cont28 | AR-150 | 3.1 | Snowtack 385F | 5.0 | 6 | — | <6 | — |

The adhesive formulations provide good adhesion on all the application substrates building to permanency with facestock tear on most of the substrates. Illustrative examples are given in Table 3. All the samples were coated on release liner, dried at 70° C. and transferred onto high gloss paper. The coat weights ranged from 20–24/qm².

TABLE 3

| Ex/Cont | 90° Peel N/m SS | PE | PET | RTS 500 g, min |
|---|---|---|---|---|
| Ex3 | — | 200 | — | — |
| Ex5 | 510 | 260 | 488 | 14 |
| Ex6 | 630pt | 300 | 580pt | 30 |
| Ex11 | pt | 190 | pt | 25 |
| Ex13 | — | 180 | — | 20 |
| Ex19 | — | 170 | — | 11 |
| Ex36 | — | 236 | — | 7 |
| Ex37 | — | 275 | — | 10 |
| Ex38 | — | 200 | — | 9 |
| Ex39 | pt | 260 | pt | 10 |
| Ex40 | pt | 170 | pt | 10 |
| Ex46 | 540pt | 255 | 332slpt | — |
| Ex47 | — | 256 | — | 17 |
| Ex48 | — | 255 | — | 18 |
| Ex49 | — | 233 | — | 7 |
| Ex50 | 400pt | 185 | 400pt | 22c |
| Ex51 | 400pt | 162 | 400pt | 35c |
| Ex52 | 420pt | 214 | 470 | 24c |
| Ex53 | pt | 240 | pt | 15 |
| Cont14 | — | 200 | — | 60 |
| Cont28 | pt | 244 | pt | 16 |
| Cont29 | pt | 240 | pt | 17 | pt = facestock tear
c = cohesive failure

The adhesives of the invention are formulated to separate clean from a substrate within about 5 minutes under exposure to hot water or alkali at 50°–60° C. or more. This is to satisfy domestic and industrial needs of rapid separation without residue. It is preferred they resist cold water separation, except by peeling because on shelf presentation a labeled substrate may require ongoing resistance to exposure to cold water, although cold water attack at the adhesive-substrate interface may enable repositionable peeling during the period of cold water exposure. In addition, some applications permit cold water removability in addition to hot water/alkali removability. The data in Table 4 establishes times in minutes of cold water separation for some Examples and Controls as a point of reference for other characteristics of label performance.

TABLE 4

| Ex/Cont | Surfactant | wt. % | Tackifying Resin | wt. | Cold Water Removal Time, Min PE | Cold Water Removal Time, Min PET |
|---|---|---|---|---|---|---|
| Ex1 | AR-150 | 5.0 | Pentalyn 261 | 5.0 | 7 | 4 |
| Ex2 | AR-150 | 5.0 | Pentalyn 261 | 10.0 | — | — |

TABLE 4-continued

| Ex/Cont | Surfactant | wt. % | Tackifying Resin | wt. | Cold Water Removal Time, Min PE | PET |
|---|---|---|---|---|---|---|
| Ex3 | AR-150 | 2.5 | Pentalyn 261 | 5.0 | >10 | >10 |
| Ex4 | AR-150 | 2.5 | Pentalyn 261 | 7.5 | >10 | — |
| Ex5 | AR-150 | 5.0 | Unitac 70 | 10.0 | — | — |
| Ex6 | AR-150 | 5.0 | Unitac 70 | 20.0 | — | — |
| Ex7 | AR-150 | 5.0 | Unitac 70 | 15.0 | — | — |
| Ex8 | AR-150 | 5.0 | Unitac 70 | 5.0 | — | — |
| Ex9 | AR-150 | 2.5 | Unitac 70 | 7.5 | >25 | — |
| Ex10 | AR-150 | 5.0 | Sylvatac R85 | 5.0 | 5 | — |
| Ex11 | AR-150 | 2.5 | Sylvatac R85 | 5.0 | >10 | — |
| Ex12 | AR-150 | 5.0 | Sylvatac R85 | 7.5 | 3 | — |
| Ex13 | AR-150 | 2.5 | Sylvatac R85 | 7.5 | 7 | — |
| Ex14 | AR-150 | 5.0 | Sylvatac R85 | 10.0 | 4 | — |
| Ex15 | AR-150 | 2.0 | Sylvatac R85 | 5.0 | >20 | — |
| Ex16 | AR-150 | 2.25 | Sylvatac R85 | 7.5 | >20 | — |
| Ex17 | AR-150 | 2.0 | Sylvatac R85 | 10.0 | 10 | — |
| Ex18 | AR-150 | 2.25 | Sylvatac R85 | 10.0 | 9 | — |
| Ex19 | AR-150 | 5.0 | Resin 731D | 10.0 | 7 | — |
| Ex20 | AR-150 | 2.5 | Resin 731D | 10.0 | 10 | — |
| Ex21 | AR-150 | 5.0 | Foral AX | 10.0 | >15 | — |
| Ex22 | AR-150 | 2.5 | Foral AX | 10.0 | >15 | — |
| Ex23 | Dresinate 731 | 5.0 | Snowtack 301A | 5.0 | 10 | — |
| Ex24 | Dresinate 515 | 5.0 | Snowtack 301A | 5.0 | >10 | — |
| Ex25 | AR-150 | 5.0 | Snowtack 301A | 5.0 | 12 | 5 |
| Ex26 | AR-150 | 5.0 | Snowtack 301A | 20.0 | <10 | <5 |
| Ex27 | AR-150 | 5.0 | Snowtack 301A | 10.0 | 14 | — |
| Ex28 | AR-150 | 2.5 | Snowtack 301A | 10.0 | 14 | — |
| Ex29 | AR-150 | 5.0 | Snowtack 301A | 15.0 | <10 | — |
| Ex30 | AR-150 | 2.5 | Snowtack 301A | 15.0 | 12 | — |
| Ex31 | AR-150 | 3.25 | Snowtack 301A | 5.0 | >20 | — |
| Ex32 | AR-150 | 3.0 | Snowtack 301A | 7.5 | 13 | — |
| Ex33 | AR-150 | 2.75 | Snowtack 301A | 7.5 | >30 | — |
| Ex34 | AR-150 | 1.5 | Snowtack 301A | 10.0 | 10 | — |
| Ex35 | AR-150 | 1.25 | Snowtack 301A | 10.0 | >15 | — |
| Ex36 | AR-150 | 2.82 | Snowtack 301A | 8.0 | <10 | — |
| Ex37 | AR-150 | 1.75 | Snowtack 301A | 12.25 | <10 | — |
| Ex38 | AR-150 | 2.95 | Snowtack 301A | 7.5 | >15 | — |
| Ex39 | AR-150 | 3.1 | Snowtack 301A | 5.0 | >20 | — |
| Ex40 | AR-150 | 3.15 | Snowtack 301A | 5.0 | >20 | — |
| Ex41 | AR-150 | 5.0 | Snowtack 385F | 10.0 | 12 | — |
| Ex42 | AR-150 | 2.5 | Snowtack 385F | 10.0 | >20 | — |
| Ex43 | AR-150 | 5.0 | Snowtack 385F | 15.0 | <10 | — |
| Ex44 | AR-150 | 2.5 | Snowtack 385F | 15.0 | >20 | — |
| Ex45 | AR-150 | 3.75 | Snowtack 385F | 5.0 | 7 | — |
| Ex46 | AR-150 | 3.3 | Snowtack 385F | 5.0 | >30 | — |
| Ex47 | AR-150 | 2.82 | Snowtack 385F | 8.0 | >15 | — |
| Ex48 | AR-150 | 2.85 | Snowtack 385F | 7.5 | >20 | — |
| Ex49 | AR-150 | 2.95 | Snowtack 385F | 7.5 | >20 | — |
| Ex50 | AR-150 | 3.5 | Snowtack 380A | 10.0 | 10 | 10 |
| Ex51 | AR-150 | 3.25 | Snowtack 380B | 7.5 | >20 | 10 |
| Ex52 | AR-150 | 3.25 | Snowtack 820A | 6.85 | >20 | 10 |
| Ex53 | AR-150 | 3.2 | Snowtack 385F | 5.0 | >30 | — |
| Ex54 | AR-150 | 3.15 | Snowtack 385F | 5.0 | >30 | — |
| Cont1 | AR-150 | 0.0 | Unitac 70 | 10.0 | >30 | — |
| Cont2 | AR-150 | 5.0 | Unitac 70 | 0.0 | >30 | — |
| Cont3 | AR-150 | 10.0 | Unitac 70 | 0.0 | >30 | — |
| Cont4 | AR-150 | 1.0 | Sylvatac R85 | 5.0 | >25 | — |
| Cont5 | AR-150 | 1.75 | Sylvatac R85 | 5.0 | >30 | — |
| Cont6 | AR-150 | 1.5 | Sylvatac R85 | 7.5 | >30 | — |
| Cont7 | Dresinate 91 | 5.0 | Sylvatac R85 | 0.0 | >30 | — |
| Cont8 | Dresinate 91 | 2.5 | Sylvatac R85 | 5.0 | >15 | — |
| Cont9 | Dresinate 91 | 1.5 | Sylvatac R85 | 5.0 | >15 | — |
| Cont10 | AR-150 | 5.0 | Resin 731D | 5.0 | 19 | — |
| Cont11 | AR-150 | 2.5 | Resin 731D | 5.0 | >30 | — |
| Cont12 | AR-150 | 5.0 | Foral AX | 5.0 | >15 | — |
| Cont13 | AR-150 | 2.5 | Foral AX | 5.0 | >15 | — |
| Cont14 | Dresinate 731 | 3.0 | Snowtack 301A | 5.0 | >30 | — |
| Cont15 | Dresinate 515 | 3.0 | Snowtack 301A | 5.0 | >30 | — |
| Cont16 | AR-150 | 2.5 | Snowtack 301A | 5.0 | >60 | — |
| Cont17 | AR-150 | 2.75 | Snowtack 301A | 5.0 | >30 | — |
| Cont18 | AR-150 | 2.5 | Snowtack 301A | 7.5 | >20 | — |
| Cont19 | AR-150 | 0.0 | Snowtack 301A | 10.0 | >30 | — |
| Cont20 | AR-150 | 0.0 | Snowtack 301A | 20.0 | >30 | — |
| Cont21 | AR-150 | 2.5 | Snowtack 385F | 5.0 | >60 | — |
| Cont22 | AR-150 | 2.75 | Snowtack 385F | 5.0 | >30 | — |
| Cont23 | AR-150 | 2.5 | Snowtack 385F | 7.5 | >30 | — |
| Cont24 | AR-150 | 3.0 | Snowtack 385F | 7.5 | >20 | — |
| Cont25 | AR-150 | 2.75 | Snowtack 385F | 7.5 | >30 | — |
| Cont26 | AR-150 | 0.0 | Snowtack 385F | 10.0 | >30 | — |
| Cont27 | AR-150 | 0.0 | Snowtack 385F | 20.0 | >30 | — |

TABLE 4-continued

| Ex/Cont | Surfactant | Tackifying wt. % | Resin | wt. | Cold Water Removal Time, Min PE | PET |
|---|---|---|---|---|---|---|
| Cont28 | AR-150 | 3.1 | Snowtack 385F | 5.0 | >30 | — |

> means that test was discontinued at the stated time

The adhesive formulations provide good adhesion on all the application substrates building to permanency with facestock tear on most of the substrates. Illustrative examples are given in table III. All the samples were coated on release liner, dried at 70° C. and transferred onto High Gloss paper. The coat weights ranged from 20–24g/sqm.

What is claimed is:

1. A pressure-sensitive adhesive composition which comprises:
   a) an acrylic, pressure-sensitive adhesive polymer formed by emulsion polymerization, which polymer comprises, on a polymerized basis and based on the total weight of the monomers:
      (i) at least one alkyl acrylate containing from about 4 to about 8 carbon atoms in the alkyl group, the total amount of alkyl acrylate monomers being at least about 35 percent by weight of the monomers; and
      (ii) at least one unsaturated carboxylic acid containing from about 3 to about 5 carbon atoms, present in a total positive amount up to about 5 percent by weight of the monomers, said formed emulsion polymer being combined with:
   b) for each 100 parts by weight of the formed emulsion polymer:
      (i) from about 3 to about 20 parts by weight of a rosin acid tackifier and,
      (ii) from about 1 to about 10 parts by weight of a rosin based surfactant,
      said pressure sensitive adhesive composition when applied to a paper being capable of self-separating from a nonpaper surface of polar or nonpolar substrates in less than about 5 minutes under the action of hot water of alkali.

2. A pressure-sensitize adhesive as claimed in claim 1 in which the tackifier is provided in a concentration of about 3 to about 15 parts by weight.

3. A pressure-sensitive adhesive as claimed in claim 1 in which the surfactant is provided in an amount of from about 1 to about 5 parts by weight.

4. A pressure-sensitive adhesive as claimed in claim 2 in which the surfactant is provided in an amount of from about 1 to about 5 parts by weight.

5. A pressure-sensitive adhesive as claimed in claim 1 in which the tackifier is noncrystallizing, has an acid number greater than about 50 and less than about 210 and is selected from the group consisting of at least partially polymerized rosins, modified rosins, disproportionate rosins, stabilized rosins, hydrogenated rosins and mixtures thereof.

6. A pressure-sensitive adhesive as claimed in claim 1 in which the tackifier has an acid number greater than about 50 and less than about 210.

7. A pressure-sensitive adhesive as claimed in claim 2 in which the tackifier has an acid number greater than about 50 and less than about 210.

8. A pressure-sensitive adhesive as claimed in claim 3 in which the tackifier has an acid number greater than about 50 and less than about 210.

9. A pressure-sensitive adhesive as claimed in claim 4 in which the tackifier has an acid number greater than about 50 and less than about 210.

10. A pressure-sensitive adhesive as claimed in claim 1 in which the surfactant is a nonionic pale wood rosin containing about 15 mols of ethyleneoxide.

11. A pressure-sensitive adhesive as claimed in claim 5 in which the surfactant is a nonionic pale wood rosin containing about 15 mols of ethyleneoxide.

12. A pressure-sensitive adhesive as claimed in claim 9 in which the surfactant is a nonionic pale wood rosin containing about 15 mols of ethyleneoxide.

13. A pressure-sensitive adhesive composition which comprises:
   a) an inherently tacky, pressure-sensitive adhesive polymer formed by emulsion polymerization, which polymer comprises, on a polymerized basis and based on the total weight of the monomers:
      (i) at least one alkyl acrylate containing from about 4 to about 8 carbon atoms in the alkyl group, the total amount of alkyl acrylate present being from about 35 to 60 percent by weight;
      (ii) at least one vinyl ester containing from about 2 to about 16 carbon atoms in the alkyl group of the acid, the total amount of the vinyl ester present being from 15 to about 35 percent by weight;
      (iii) at least one diester of a dicarboxylic acid in which each alkyl group of the diester independently contains from about 6 to about 12 carbon atoms, the total of the diesters present being in amount from about 20 to about 40 percent by weight; and
      (iv) at least one unsaturated carboxylic acid containing from about 3 to about 5 carbon atoms, the total of the unsaturated carboxylic acid being present in a positive amount up to about 5 percent by weight, said polymer having a glass transition temperature of less than about −30° C. and a gel content of from about 50 to about 70 percent by weight of the polymer, said formed emulsion polymer being combined with:
   b) for each 100 parts by weight of said formed emulsion polymer;
      (i) from about 3 to about 20 parts by weight of a rosin acid tackifer and,
      (ii) from about 1 to about 10 parts by weight of a rosin based surfactant,
      said pressure sensitive adhesive composition when applied to a paper backing being capable of self-separation from nonpaper surfaces of a polar or nonpolar substrate in hot water or alkali in less than about 5 minutes.

14. A pressure-sensitive adhesive as claimed in claim 13 in which the tackifier is provided in a concentration of about 3 to about 15 parts by weight.

15. A pressure-sensitive adhesive as claimed in claim 13 in which the surfactant is provided in an amount of from about 1 to about 5 parts by weight.

16. A pressure-sensitive adhesive as claimed in claim 14 in which the surfactant is provided in an amount of from about 1 to about 5 parts by weight.

17. A pressure-sensitive adhesive as claimed in claim 13 in which the tackifier has an acid number greater than about 50 and less than about 210.

18. A pressure-sensitive adhesive as claimed in claim 13 in which the tackifier is noncrystallizing, has an acid number greater than about 50 and less than about 210 and is selected from the group consisting of at least partially polymerized rosin, modified rosin, disproportionate rosin, stabilized rosin, hydrogenated rosin and mixture thereof.

19. A pressure-sensitive adhesive as claimed in claim 14 in which the tackifier has an acid number greater than about 50 and less than about 210.

20. A pressure-sensitive adhesive as claimed in claim 16 in which the tackifier has an acid number greater than about 50 and less than about 210.

21. A pressure-sensitive adhesive as claimed in claim 16 in which the tackifier is noncrystallizing, has an acid number greater than about 50 and less than about 210 and is selected from the group consisting of at least partially polymerized rosins, modified rosins, disproportionate rosins, stabilized rosins, hydrogenated rosins and mixtures thereof.

22. A pressure-sensitive adhesive as claimed in claim 13 in which the surfactant is a nonionic pale wood rosin containing about 15 mols of ethyleneoxide.

23. A pressure-sensitive adhesive as claimed in claim 14 in which the surfactant is a nonionic pale wood rosin containing about 15 mols of ethyleneoxide.

24. A pressure-sensitive adhesive as claimed in claim 16 in which the surfactant is a nonionic pale wood rosin containing about 15 mols of ethyleneoxide.

25. A pressure-sensitive adhesive as claimed in claim 18 in which the surfactant is a nonionic pale wood rosin containing about 15 mols of ethyleneoxide.

26. A pressure-sensitive adhesive composition which comprises:
   (a) an inherently tacky, pressure-sensitive adhesive polymer formed by emulsion polymerization, which polymer comprises, on a polymerized basis and based on the total weight of the monomers:
      (i) at least one alkyl acrylate including 2-ethylhexyl acrylate, isooctyl acrylate and mixtures thereof and having from about 4 to about 8 carbon atoms in the alkyl group, the total amount of alkyl acrylate present being from about 40 to about 50 percent by weight;
      (ii) vinyl acetate in an amount of from 15 to about 35 percent by weight;
      (iii) at least one diester of a dicarboxylic acid selected from di-2-ethylhexyl maleate and di-2-ethylhexyl fumarate and mixtures thereof present in an amount from about 20 to about 40 percent by weight; and
      (iv) an unsaturated carboxylic acid selected from the group consisting of acrylic acid, methacrylic acid and mixtures thereof present in an amount of from about 1 to about 3 percent by weight, said polymer having a glass transition temperature of less than about −30° C. and a gel content of from about 50 to about 70 percent by weight of the polymer said formed emulsion polymer being combined with:
   b) for each 100 parts by weight of said formed emulsion polymer:
      (i) from about 3 to about 20 parts by weight of a rosin acid tackifier having an acid number greater than about 50 and less than 210;
      (ii) from about 1 to about 10 parts by weight of a rosin based surfactant;
      said pressure sensitive adhesive composition when applied to a paper backing being removable from a nonpaper surface of a polar or nonpolar substrate in hot water or alkali in less than 5 minutes.

27. A pressure-sensitive adhesive composition as claimed in claim 26 in which the tackifier is provided in a concentration of about 3 to about 15 parts by weight.

28. A pressure-sensitive adhesive as claimed in claim 26 in which the surfactant is provided in an amount of from about 1 to about 5 parts by weight.

29. A pressure-sensitive adhesive as claimed in claim 28 in which the surfactant is provided in an amount of from about 1 to about 5 parts by weight.

30. A pressure-sensitive adhesive as claimed in claim 26 in which the tackifier has an acid number greater than about 50 and less than about 210.

31. A pressure-sensitive adhesive as claimed in claim 26 in which the tackifier is non crystallizing, has an acid number of greater than about 50 and less than about 210 and is selected from the group consisting of at least partially polymerized rosins, modified rosins, disproportionate rosins, stabilized rosins, hydrogenated rosins and mixtures thereof.

32. A pressure-sensitive adhesive as claimed in claim 26 in which the surfactant is a nonionic pale wood rosin containing about 15 mols of ethleneoxide.

33. A pressure-sensitive adhesive as claimed in claim 28 in which the surfactant is a nonionic pale wood rosin containing about 15 mols of ethyleneoxide.

34. A pressure-sensitive adhesive as claimed in claim 24 in which the surfactant is a nonionic pale wood rosin containing about 15 mols of ethyleneoxide.

35. A pressure-sensitive adhesive composition as claimed in claim 26 in which the inherently tacky, pressure-sensitive adhesive polymer comprises based on the total weight of the monomers:
   i) about 48 percent by weight 2-ethylhexyl acrylate;
   ii) about 21 percent by weight vinyl acetate;
   iii) about 29 percent by weight di-2-ethylhexyl maleate;
   iv) about 1 percent by weight acrylic acid and about 1 percent by weight methacrylic acid; and wherein the surfactant is an ethylene oxide adduct of pale wood rosin containing about 15 mols of ethylene oxide.

36. A pressure-sensitive adhesive composition as claimed in claim 31 in which the inherently tacky, pressure-sensitive adhesive polymer comprises based on the total weight of the monomers:
   i) about 48 percent by weight 2-ethylhexyl acrylate;
   ii) about 21 percent by weight vinyl acetate;
   iii) about 29 percent by weight di-2-ethylhexyl maleate;
   iv) about 1 percent by weight acrylic acid and about 1 percent by weight methacrylic acid; and wherein the surfactant is an ethylene oxide adduct of pale wood rosin containing about 15 mols of ethylene oxide.

* * * * *

UNITED STATES PATENT AND TRADEMARK OFFICE
CERTIFICATE OF CORRECTION

PATENT NO. : 5,183,841

DATED : February 2, 1993

INVENTOR(S) : Margaret M. Bernard

It is certified that error appears in the above-indentified patent and that said Letters Patent is hereby corrected as shown below:

```
Column 1, line 7, before "application" delete "of".
Column 1, line 13, before "INVENTION" insert -- THE --.
Column 1, line 48, change "plastisizers" to
         -- plasticizers --.

Column 2, line 12, change "add" to -- and --.
Column 2, line 50, change "iso-octyl" to -- isooctyl --.

Column 4, line 68, change "atom" to -- atoms --.

Column 5, line 40, after "from" insert -- 1 --.
Column 5, line 56, after "contain" delete the comma.

Column 6, line 4, change "maybe" to -- may be --.

Column 7, line 26, change "build" to -- builds --.
Column 7, line 32, change "systems" to -- system --.

Column 8, line 1, after "number" delete "(Acid No.)".
Column 8, line 2, after "acid" change "no." to -- number --.
Column 8, line 9, change "73iD" to -- 731D --.
Column 8, line 42, after "allows" delete "them".

Column 10, line 12, change "vice a versa" to
         -- vice versa --.
```

UNITED STATES PATENT AND TRADEMARK OFFICE
CERTIFICATE OF CORRECTION

PATENT NO. : 5,183,841
DATED : February 2, 1993
INVENTOR(S) : Margaret M. Bernard It is certified that error appears in the above-indentified patent and that said Letters Patent is hereby corrected as shown below:

In the Claims:

Column 15, line 44, change "sensitize" to -- sensitive --.

Column 16, line 40, after "being in" insert -- an --.

Column 17, line 13, change "mixture" to -- mixtures --.

Column 18, line 25, change "non crystallizing" to
    -- noncrystallizing --.

Signed and Sealed this

Twenty-fourth Day of May, 1994

Attest:

BRUCE LEHMAN

Attesting Officer                Commissioner of Patents and Trademarks